United States Patent
Hennig et al.

[11] 3,881,314
[45] May 6, 1975

[54] POWER TRANSMISSION CHAIN

[75] Inventors: Kurt Hennig; Hans-Peter Schmidberger, both of Munich, Germany

[73] Assignee: Kurt Hennig, Munich, Germany

[22] Filed: Aug. 15, 1973

[21] Appl. No.: 388,401

[30] Foreign Application Priority Data
- Aug. 31, 1972 Germany............................ 2242898
- Nov. 23, 1972 Germany............................ 2257511
- Nov. 4, 1972 Germany............................ 2254086

[52] U.S. Cl.............. 59/78.1; 74/245 C; 198/193; 248/49; 248/51
[51] Int. Cl. ........................ F16l 3/00; F16g 13/16
[58] Field of Search.......... 214/DIG. 9; 191/12 R, 2, 191/9; 74/245 R, 245 C; 198/193, 189; 248/49, 51, 55, 58; 59/78.1

[56] References Cited
UNITED STATES PATENTS

| | | | |
|---|---|---|---|
| 1,695,371 | 12/1928 | Felde | 198/193 |
| 1,831,978 | 11/1931 | Summers | 198/193 |
| 2,975,807 | 3/1961 | Waninger | 59/78.1 |
| 3,157,376 | 11/1964 | Merker et al. | 248/49 |
| 3,382,668 | 5/1968 | Berkes et al. | 248/51 |
| 3,716,986 | 2/1973 | Cork et al. | 59/78.1 |
| 3,772,875 | 11/1973 | Viano | 248/49 |
| 3,782,670 | 1/1974 | Kielma | 59/78.1 |

FOREIGN PATENTS OR APPLICATIONS
1,073,051  9/1954  France................................ 198/193

*Primary Examiner*—Samuel Scott
*Attorney, Agent, or Firm*—Marshall and Yeasting

[57] ABSTRACT

A plurality of spaced transverse webs connect two chain belts, each web consisting of two layers of stamped sheet metal, and the two layers being formed to provide at least one opening between the layers to conduct a power supply line.

8 Claims, 8 Drawing Figures

POWER TRANSMISSION CHAIN

BACKGROUND OF THE INVENTION

This invention relates to a power transmission channel with two chain belts, and with interposed connecting webs, having recesses to receive power supply lines.

In a known power transmission channel of the above type, the connecting webs are made of flat material, in which the recesses used to hold the power supply lines are provided by machining. The manufacture of power transmission channels with connecting webs of this type is relatively expensive. The special tools needed for the machining are also subject to heavy wear. Manufacture becomes especially complicated if longitudinal holes have to be provided for the installation of a number of power supply lines.

SUMMARY OF THE INVENTION

The object of the invention is to avoid these disadvantages by providing a power transmission channel whose connecting webs can be made in a particularly simple and economical fashion, but nevertheless have the necessary stability and stiffness.

According to the invention this object is achieved in that the individual connecting webs comprise at least one member formed by a pressing operation from flat starting material into the shape of the required recesses.

The power supply lines in such channels are to some extent gripped in the manner of clips. The individual recesses in each connecting web can be matched in a simple manner, during the pressing of the shaped member, to the shape of the corresponding power supply lines. In this way the lines can be held in the connecting webs with a minimum amount of material.

Since the cross-section of the connecting web is of a shape which has a greater dimension in the longitudinal direction (i.e., is more flat than high), the connecting web has high stiffness and rigidity in spite of its extremely light construction.

In accordance with the invention an individual connecting web may comprise two web portions identically formed from flat starting material and disposed in mirror-image fashion relative to each other.

The shaping of the flat starting material (for example a sheet metal strip) can be effected by pressing the individual recesses or half-recesses in sequence. By appropriate selection of the pressing tools, the connecting web can be brought into the shape of the desired recess.

In accordance with the invention each web portion pressed from the flat starting material can extend over the full width between the chain belts.

It is however also possible to make each of the individual connecting webs from a member pressed from a double length of flat starting material with its two halves folded together, affixed in the area of the fold to one chain belt and in the area of its two ends to the other chain belt. With such a construction the individual power supply lines can be easily inserted and extracted by bending up one half of the web (as with a standard connecting web, divided in the central plane).

During the pressing procedure a shape to aid stiffening, for instance a longitudinal central rib, may advantageously be formed in the connecting web. To further increase the stiffness it is advantageous if the two longitudinal edges of the connecting web are upwardly flanged. This also ensures that due to the internally formed radius the cable or pipe used for laying cannot be damaged.

The starting material which is shaped by a pressing operation into the connecting web can have the cross-section of an extended rectangle (plain strip material). However a starting material may also be used which is already profiled for stiffening.

According to a preferred development of the invention the two web portions belonging to a connecting web consist of individual strip members preferably curved in their central area, which are joined at flat contacting limbs.

The construction of these web portions from very simple members made from strip material leads to particularly simple and economical manufacture, since the web members can be made on a large scale as mass-produced articles by stamping and pressing operations, and aligned in any desired combination to form a connecting web. The two members belonging to a connecting web can be assembled for example by spot welding, riveting, screwing or adhesive bonding to form an extremely stable unit, since they lie with their limbs flat against each other.

All web members (i.e., including those which are intended for different diameter power supply lines) are preferably given a uniform width in the longitudinal direction. According to the invention the stiffness of the connecting webs can be appreciably increased by flaring, preferably outwards, the central area of the web members. This also protects the power supply lines from damage.

In a further development of a web assembled from individual members, it is also desirable if the zones wherein the limbs of adjacent members lie flat against each other, in the central part of the strip material between flanged edges, are turned upwards, at least one connecting point being preferably provided in the turned-up area. The limbs of adjacent members in this case are preferably connected together at three points, preferably by projection welding, with the central connecting point disposed higher than the other two connecting points.

In this manner the stiffness and stability of the connecting web of the power feed channel can be further increased, without thereby making manufacture more difficult. The three-point connection of adjacent web members referred to, in conjunction with the central turned up zone between the edge flanges of the strip material, in which the limbs of adjacent members lie flat against each other, produces unusually good stiffening and stability, thus permitting the use of relatively thin strip material.

In the central part of the strip material lying between the flanged edges, the web members preferably have a bead-like stiffening rib precurved to the same outside face as the flanged edges, which effectively opens into the raised up portion of the zone wherein the limbs of adjacent members lie flat against each other. In this manner a further stiffening of the web members is produced. All the necessary forming operations (i.e., the bending of the strip material into a curved clamp, the flanging of the two edges, the indentation of the central stiffening rib and the flattening of the two limbs) can be carried out in a single pressing stage (starting from flat material).

DESCRIPTION OF THE PREFERRED EMBODIMENTS

Figure 1:
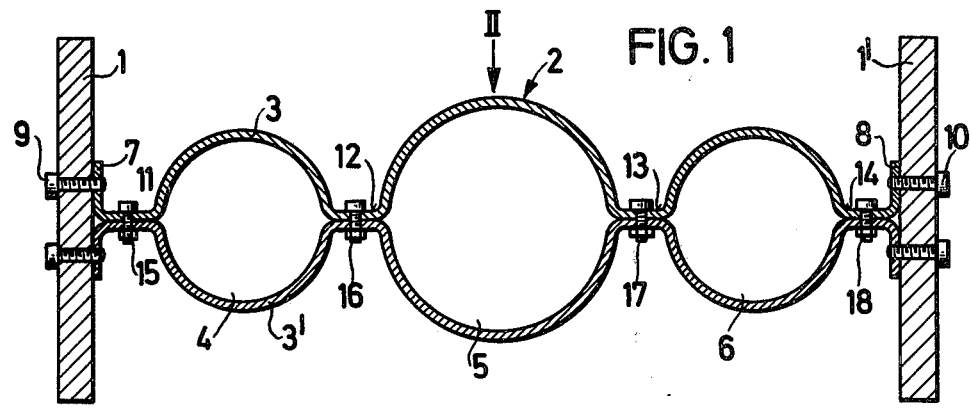
FIG. 1 is a cross-section through a first embodiment of the connecting web in a power transmission channel in accordance with the invention.
Figure 2:
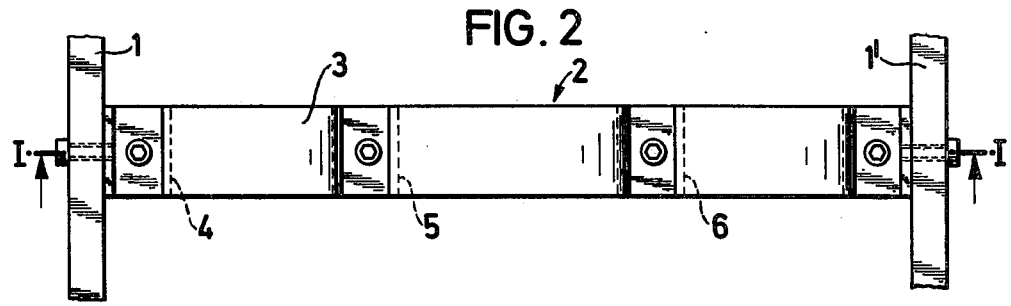
FIG. 2 is a plan view of the connecting web in FIG. 1.

Between the chain belts 1,1' in the embodiment shown in FIGS. 1 and 2 there are disposed at regular intervals connecting webs 2, each formed of two symmetrical web members 3, 3'. The web members 3, 3' form recesses 4, 5, 6 which are used to receive power supply lines (not shown).

Web member 3 (like web member 3') is made from flat starting material by pressing into the shape of the required recesses 4, 5, 6. In its formed state the web member 3 thus extends over the entire width of the web.

The ends 7, 8 of the web member 3, and the same obviously applies to the lower web member 3', are connected to the chain belts 1, 1' by screws 9, 10. On either side of the recesses 4, 5, 6 web members 3, 3' lie with flat areas 11, 12, 13, 14 in contact, and in those areas are held together by holding screws 15–18.

Figure 3:
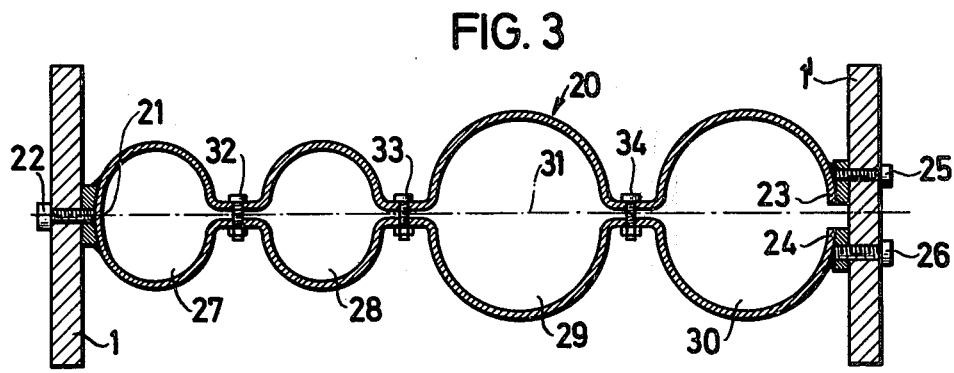
FIG. 3 is a cross-section through a second embodiment of the invention.

While in the embodiment of FIGS. 1 and 2 the individual connecting webs each comprise two identically formed web members disposed in mirror-image fashion relative to each other, FIG. 3 shows an embodiment wherein the connecting web 20 consists of a single piece made symmetrical to its centre 21. In the vicinity of this centre 21 the web member is affixed to the left chain belt 1 by a screw 22, while the two ends 23 and 24 are affixed to the other chain belt 1' by screws 25, 26.

The parts of connecting web 20 lying above and below the centre plane 31 can be held together between the recesses 27–30 by holding screws 32–34.

In this embodiment, the power supply lines can be readily inserted in the recesses or removed therefrom, by releasing the screws 32, 33, 34 and 25, and bending slightly upwards the upper half of the connecting web 20.

Starting material in the form of a simple strip can be used for making the connecting web.

During the pressing operation by which the recesses for the power supply lines are formed, the longitudinal flanges can also be turned up in the connecting web material. A central longitudinal rib can also be formed during the pressing to give added stiffening.

However, starting material can also be used which is provided with a longitudinal rib for stiffening.

Figure 4:
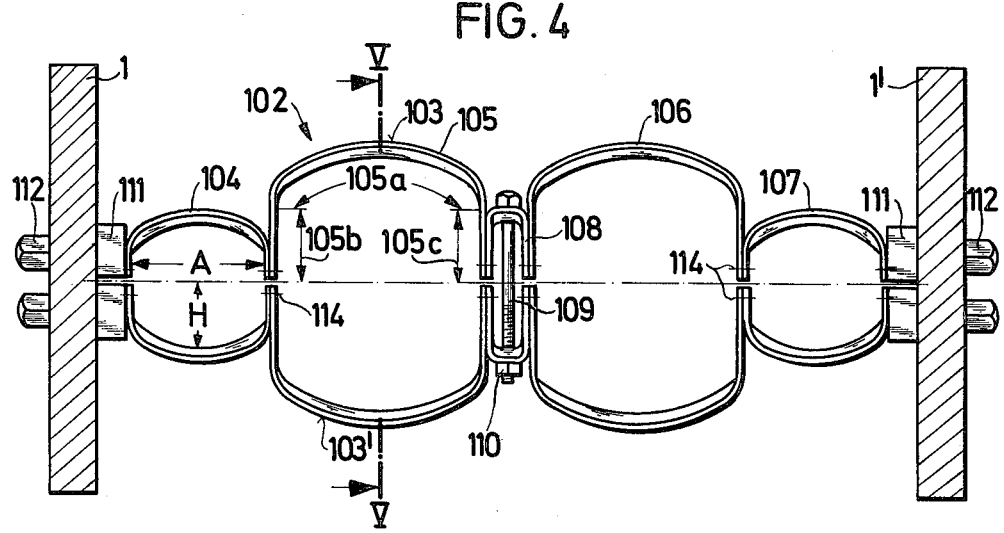
FIG. 4 is a schematic cross-section through a third connecting web in accordance with the invention.

A further embodiment of the connecting web in accordance with the invention is shown in FIG. 4. At regular intervals between the two chain belts 1, 1' of the power feed channel there are disposed connecting webs 102 which consist of two generally symmetrical web members 103 and 103'.

Like the web member 103', the web member 103 is composed of individual elements 104, 105, 106 and 107, made from strip material, preferably steel plate, each pair of oppositely disposed elements of the web members 103, 103' forming a recess for a power supply line (not shown).

Each of these web member elements has a curved central zone (e.g., 105a) and two adjacent generally parallel limbs 105b, 105c. Adjacent web members (e.g., 104 and 105) are fixedly attached to each other over their contacting limbs, for instance by spot welding.

Figure 5:
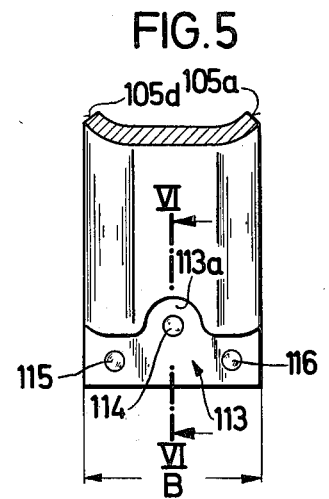
FIG. 5 is a fragmentary section on the line V—V in FIG. 4.

All the web member elements 104–107 have if possible the same width B in the longitudinal direction of the chain (see FIG. 5). Also stiffening is provided in the curved central zone (e.g., 105a) of the web member elements (e.g., 105) — See FIG. 5, as will be described in detail below with reference to FIGS. 5–8.

Between the two central web member elements 105 and 106 there is located an intermediate piece 108, which in this example is bent into clamp form from flat material and has a bore adapted to receive a connecting screw 109 with a nut 110, for holding together the two web members 103 and 103'.

At the two outer elements 104 and 107 of each web member there is affixed an end piece 111 having a threaded bore for engagement with a screw 112 joining the web member 103 or 103' to the chain belt 1 or 1'.

The gap A between the two limbs of a web member element (e.g., 104) corresponds to about twice the height H of the curved central zone of this web member element. In this way the power supply lines (not shown) can be properly held between the two web members 103 and 103' in the recesses formed by the web member elements.

In the region between two successive connecting webs, the two chain belts can be further linked by stiffening transverse members, for example round or profile bars. If desired, stiffening transverse members can also be provided in the region of the connecting webs, which preferably form supporting joints with individual web member elements.

FIGS. 5–8 show details of the joints between adjacent web member elements (e.g., 104, 105).

Figure 6:
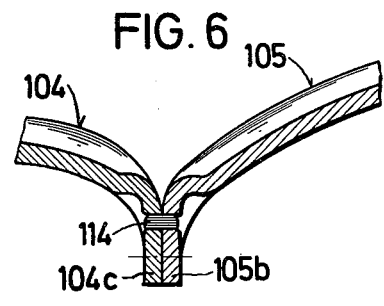
FIG. 6 is a section on the line VI—VI in FIG. 5.

In the embodiment in FIGS. 5 and 6 the edges 105d, 105e of the web member elements (with the exception of the area of the limbs 105b, 105c) are upwardly flanged and in this way stiffen the web member elements.

The zone 113 wherein the limbs (e.g., 104c, 105b) of adjacent web member elements (e.g., 104, 105) lie in flat contact, is turned up in the centre part of the strip material lying between the flanged edges (105d, 105e), and in this raised zone 113a there is provided a connecting point 114, preferably in the form of a projection weld. Two further connecting points 115, 116 (preferably again projection welds) are also disposed farther outwards and somewhat lower than the connecting point 114, so producing a very stable three-point joint.

Figure 8:
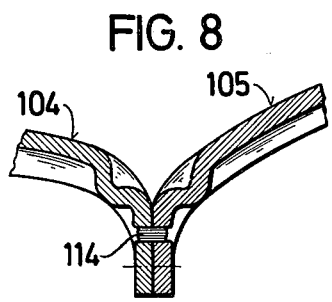
FIG. 8 is a section on the line VIII—VIII in FIG. 7.
Figure 7:
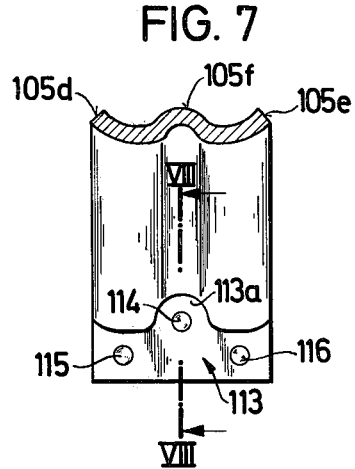
FIG. 7 is a fragmentary section (corresponding to FIG. 5) through a further embodiment.

In the variation shown in FIGS. 7 and 8, the central part of the strip material lying between the flanged edges 105d, 105e is provided with a bead-like stiffening rib 105f, which is curved towards the same outer side as the flanged edges 105d, 105e. This stiffening rib 105f opens out into the turned-up area 113a of the zone 113 wherein the limbs of adjacent web member elements lie in flat contact.

While in the embodiments in FIGS. 5 to 8 the adjacent web member elements are connected together by three weld points, in accordance with the invention these may be replaced by a two-point joint; in that case two longitudinal welds, running in the direction of the material, are preferably provided.

We claim:

1. A connecting web, for a power transmission channel having at least two chain belts transversely connected by a plurality of such webs, said connecting web
   a. having greatly improved stiffness for its weight,
   b. being formed of sheet metal strips each having a width substantially greater than its thickness, the width of each strip extending longitudinally of the channel, and
   c. consisting of two superimposed parts, each part being composed of a plurality of U-shaped sections with the legs of adjacent sections secured together in flat contact, the legs of each U-shaped section of one part being opposed to the legs of a corresponding U-shaped section of the other part, whereby said corresponding sections form an opening to receive a power supply line, and each part having a bracket interposed between two adjacent U-shaped sections and aligned with the bracket on the other part, for receiving a screw to hold the two parts together.

2. A connecting web according to claim 1 wherein a central boss is formed at the top of each leg of each U-shaped section, and such bosses of adjacent U-shaped sections are secured together.

3. A connecting web according to claim 2, wherein the adjacent bosses and contacting legs of two adjacent sections are secured together by projection welding at three points.

4. A connecting web according to claim 2, wherein each part is provided with a central stiffening rib.

5. A connecting web according to claim 4, wherein the two edges of each part are flared outward and the central rib is an outwardly pressed rib.

6. A connecting web according to claim 1, wherein the two edges of the arch portion of each U-shaped section are flared outward to stiffen the arch portion.

7. A connecting web according to claim 6, wherein the arch portion of each U-shaped section has an outward pressed central stiffening rib.

8. A connecting web according to claim 1, wherein at each end of each web there is provided a bracket having a bore to receive a screw for securing the web to a chain belt.

* * * * *